(12) United States Patent
Nayak et al.

(10) Patent No.: US 8,042,439 B2
(45) Date of Patent: Oct. 25, 2011

(54) METHOD AND APPARATUS TO REMOVE CAST FROM AN INDIVIDUAL

(76) Inventors: Suresh Nayak, Cincinnati, OH (US); Ronald R. Watson, Placida, FL (US)

(\*) Notice: Subject to any disclaimer, the term of this patent is extended or adjusted under 35 U.S.C. 154(b) by 456 days.

(21) Appl. No.: 12/315,212

(22) Filed: Dec. 1, 2008

(65) Prior Publication Data

US 2010/0132202 A1 Jun. 3, 2010

(51) Int. Cl.
*B23D 51/02* (2006.01)
(52) U.S. Cl. .......... 83/13; 30/290; 30/294; 30/370; 407/29.1; 451/79
(58) Field of Classification Search .......... 83/13; 602/5, 602/9; 30/370, 90.1, 90.6, 90.4, 289, 290, 30/294, 297, 314, 317; 606/138, 85; 407/29.1, 407/29.15; 451/79
See application file for complete search history.

(56) References Cited

U.S. PATENT DOCUMENTS

| | | | | |
|---|---|---|---|---|
| 2,187,175 A | * | 1/1940 | Prosperi | 602/9 |
| 2,490,878 A | * | 12/1949 | Marsh | 30/276 |
| 2,519,520 A | * | 8/1950 | Waxlax | 602/9 |
| 3,867,931 A | * | 2/1975 | Babka | 602/9 |
| 4,129,127 A | * | 12/1978 | Ellison | 602/12 |
| 4,625,405 A | * | 12/1986 | Hudnutt et al. | 30/370 |
| 5,435,066 A | * | 7/1995 | Bare et al. | 30/388 |

\* cited by examiner

*Primary Examiner* — Phong H Nguyen
(74) *Attorney, Agent, or Firm* — Tod R. Nissle, P.C.

(57) ABSTRACT

A method for installing a fiberglass cast on and removing the cast from an individual includes a guide track and cutting tool designed to control carefully the vertical displacement and lateral displacement of the tool when the tool is used to cut the cast, and, accordingly, to prevent, while a cast is being removed, injury to the individual.

1 Claim, 3 Drawing Sheets

METHOD AND APPARATUS TO REMOVE CAST FROM AN INDIVIDUAL

This invention relates to casts that are temporarily placed on individual's skeletal or muscular structure. One common use of a cast is to support the leg, arm, or other part of the body.

More particularly, the invention pertains to a method and apparatus for removing such casts.

First Trend

A first trend in connection with the removal of a cast comprises placing an elongate tubular guide or channel on a portion of the body of an individual prior to applying the cast and permitting the cast to solidify. The cast, when applied, covers the tubular guide. When the time comes to remove the cast an elongate cutting wire is fed through the tubular guide. The cutting wire is moved back and forth to outwardly cut through the cast, or is otherwise forced outwardly through the cast to cut the cast. One common cutting wire is identified by the name Giggli saw.

Second Trend

A second trend in connection with the removal of a cast comprises placing an elongate tubular guide or channel on a portion of the body of an individual prior to applying the cast and permitting the cast to solidify. The cast, when applied, covers the tubular guide. When the time comes to remove the cast a scissors tool is utilized to cut through the cast. The tubular guide helps to direct the scissors.

Third Trend

A third trend in connection with the removal of a cast comprises utilizing a shield comprising an elongate relatively flat strip of material. The shield is placed on a portion of the body of an individual prior to applying the cast and permitting the cast to solidify. The cast, when applied, covers the flat strip of material. When the time comes to remove the cast with a cutting tool, the flat strip of material functions to shield the individual from a cutting tool.

Fourth Trend

A fourth trend in connection with the removal of a cast comprises utilizing a tool with a rigid foot that a user slides along a shield strip or guide channel. The tool also includes a rotary cutting tool that is situated above the fixed foot and cuts the cast. The tool utilizes a circular, flat, thin blade with teeth situated around the circular peripheral edge of the blade Fifth Trend A fifth trend in connection with the removal of a cast comprises utilizing a Stryker saw or similar tool to remove a cast. A Stryker saw includes a housing and a saw blade rotatably mounted on the housing. The saw blade is a panel-shaped, relatively thin, flat, circular blade with cutting or abrading material formed on the sides of the blade near the circular outer peripheral edge of the blade. The outer peripheral edge of the blade does not include abrading or cutting material; this to minimize the likelihood that the outer edge of the blade will cut the skin of an individual. The rapid rotation of the blade can, however, cause the outer peripheral edge to burn or cut the skin of an individual on contact. A user grasps the housing and uses the saw blade to cut through a cast while endeavoring not to contact and injure the skin of the individual. The Stryker saw can be, but often is not, utilized in connection with a protective strip or with a guide. The user simply does his or her best to guide and control the saw and to not inadvertently burn or cut the skin of an individual. Such inadvertent injury does, however, occur on a fairly regular basis. Further, the noise associated with use of the saw often effectively functions to terrify children who are having a cast removed. Such fear on the part of a child and the child's parent is magnified when a user inadvertently contacts and burns or cuts the skin of the child with the saw blade.

The Stryker saw is currently by far the presently preferred, and usually the only, method of removing a cast. The methods and tools set forth above with respect to the third trend are currently sometimes used on a limited basis in the market. However, the methods and tools set forth above in the first through the fourth trends otherwise are basically largely, if not entirely, obsolete, are currently ignored, and in the real world exist only in the print and paper comprising earlier issued patents, magazine articles, and other documents.

The Stryker saw has evidently been the preferred method of removing a cast for at least the last twenty (20) years; any perceived motivation to provide an alternate method or removing a cast has not provided sufficient impetus to displace use of the Stryker saw, or to reinstate the obsolete methodology set forth in prior issued patents or other documents.

Nonetheless, it is a principal object of the invention is to develop an improved method and apparatus to remove a cast, in particular a fiberglass cast, from an individual. A fiberglass cast is significantly more difficult to cut than was the old fashioned plaster cast.

This and other, further and more specific objects and advantages of the invention will be apparent to those skilled in the art from the following detailed description thereof, taken in conjunction with the drawings, in which.

Figure 1:
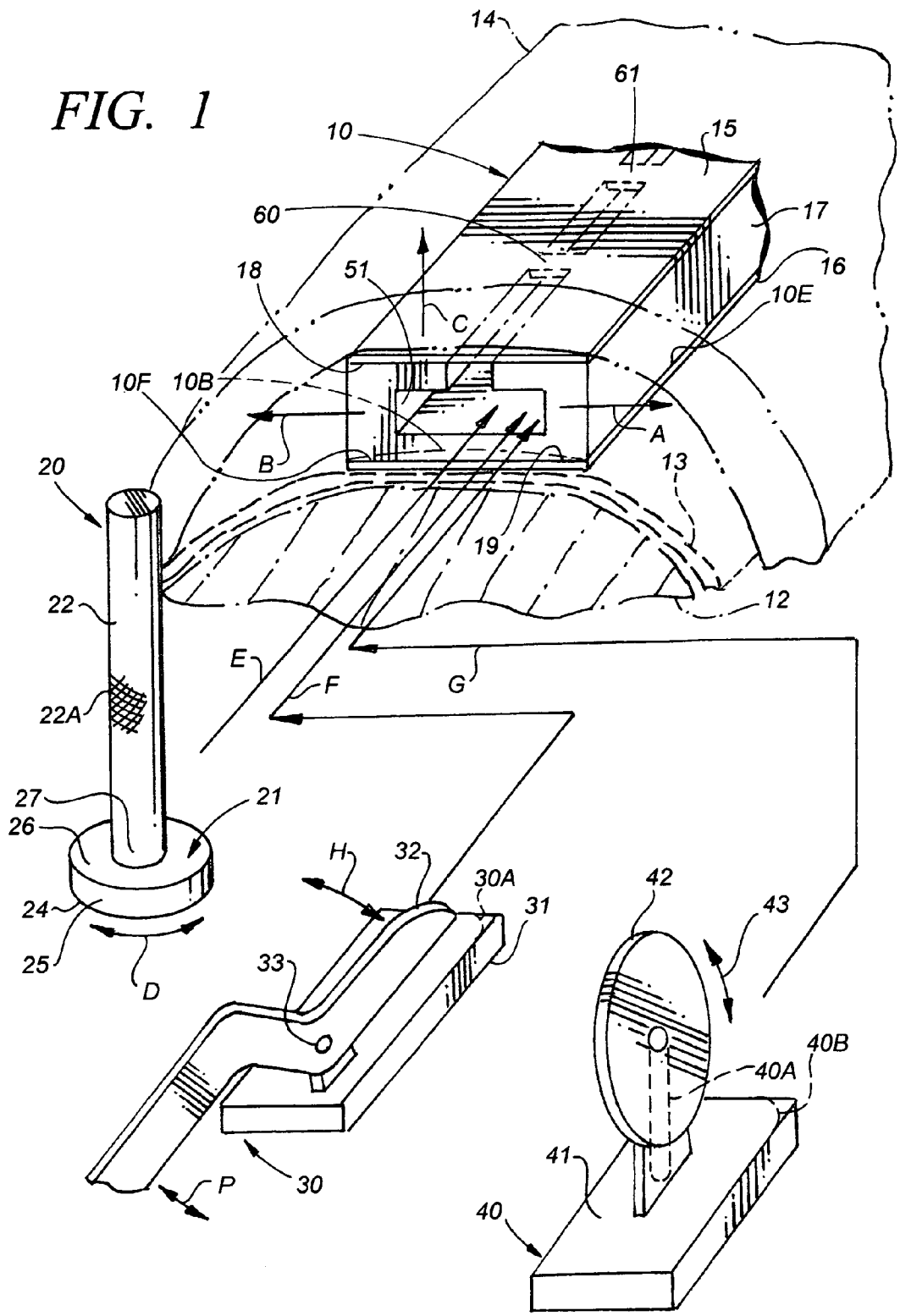
FIG. 1 is an exploded perspective view illustrating apparatus constructed in accordance with the principles of the invention and the mode of operation thereof.

Briefly, in accordance with the invention I provide an improved method of installing a fiberglass cast on and removing the cast from an individual. The method comprises the step of providing a track (10) with a top; a bottom; a length (L); an elongate primary guide opening (11) extending the length of the track, the opening having a width (W) and a selected shape and dimension; and, an elongate secondary guide opening (18) extending from the primary opening upwardly to the top of the track, and having a width less than the primary opening. The method also comprises the step of providing a rotatable bit (20) including a rotatable shaft (22) and a tracking foot (21). The shaft has an outer surface shaped and dimensioned to cut through a fiberglass cast; a width less than the width of the secondary guide opening; a distal end (27); and, is shaped and dimensioned to move along the secondary opening. The tracking foot is foot (21) is attached to the distal end of the shaft; has an outer surface (25); has a width greater than the width of the shaft (22) and less than the width of the primary opening, is free of cutting surfaces, and is shaped and dimensioned to generally conform to the shape and dimension of the primary guide opening to minimize lateral movement of the foot in the primary guide opening and to permit the foot to move freely along the primary opening. The method also includes the steps of placing the track (10) on an individual; applying at a first selected time a fiberglass cast on the individual, the cast covering substantially all of the track (10); and, at a second selected time subsequent to said first time, rotating the bit and moving the foot along the primary opening and the shaft along said secondary opening such that the shaft cuts through the fiberglass cast.

Turning now to the drawings, which depict the presently preferred embodiments of the invention for the purpose of illustrating the practice thereof and not by way of limitation of the scope of the invention and in which like reference characters refer to corresponding elements throughout the several views, FIG. 1 illustrates a track generally indicated by reference character 10. Track 10 preferably is, as will be described, somewhat pliable and is not rigid. Such pliability permits the track 10 to conform to the body of an individual. Track 10 includes top 18, bottom 19, and side 17. Primary opening 11 extends along the length (L) (FIG. 3) of track 10. Primary opening 11 includes and is circumscribed by vertically oriented sides 51 and 52, horizontally oriented bottom 50, and ceiling 53. As can be seen, primary opening 11 currently preferably has a rectangular cross section. The shape and dimension of opening 11 can, however, vary as desired and have, by way of example, a triangular, trapezoidal, or spherical cross section. If desired, the bottom of track 10 can, instead of being flat, be provided with a concave contour 10B (FIGS. 1 and 3) to enable track 10 to better contour to an arm or other portion of an individual's body. Similarly, if desired, the lower parallel outer edges 10E and 10F of track 10 can, instead of comprising straight edges, be rounded or provided with a radius as indicated by dashed line 10C and 10D in FIG. 2. The use of rounded edges 10C and 10D reduces the likelihood that edges 10E and 10F will generate uncomfortable pressure points in the tissue of an individual.

Secondary opening 18A also extends along the length (L) of track 10, and, extends upwardly from opening 11 to the top 18 of track 10. The width of opening 18A is less than the width W of the primary opening 11 and is greater than the width S of shaft 22 of bit 20 (FIG. 1).

Figure 2:
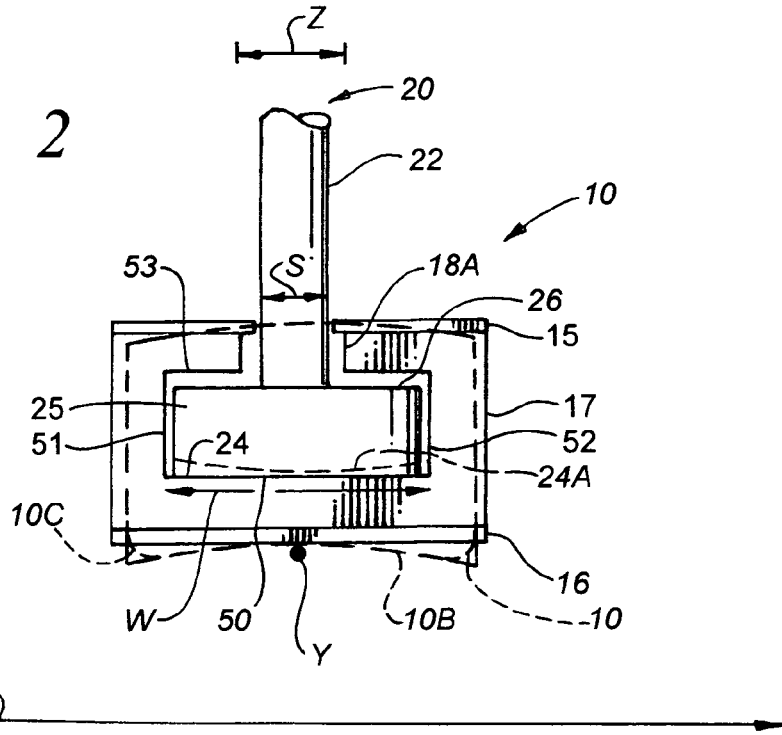
FIG. 2 is a front view further illustrating the mode of operation of one of the embodiments of the invention.

As is illustrated in FIGS. 1 and 2, an adhesive strip 16 can, if desired, be applied to track 10 and extend along the bottom 19 of track 10. Strip 16 can, if desired, be covered with a protective strip of paper or other material. The protective strip is peeled off strip 16 prior to emplacing strip 10 on an individual when a cast is being applied to the individual.

A protective strip of material 15 (FIG. 1) can, if desired, be applied to the top 18 of track 10 to cover secondary opening 18. Strip 15 is preferred because it prevents fiberglass or other material from entering openings 18A and 11 when a cast is being formed over track 10. The strip 15 is preferably formed of a thin sheet of paper, polymer, or some other material that can readily be cut by bit 20 when foot 21 moves along the length of opening 11. In an alternate embodiment of the invention, ribs or bridge structures 60, 61 extend across strip 15 at selected spaced apart locations along the length of opening 18. Ribs 60, 61 can be utilized in place of or in conjunction with strip 15.

Figure 3:
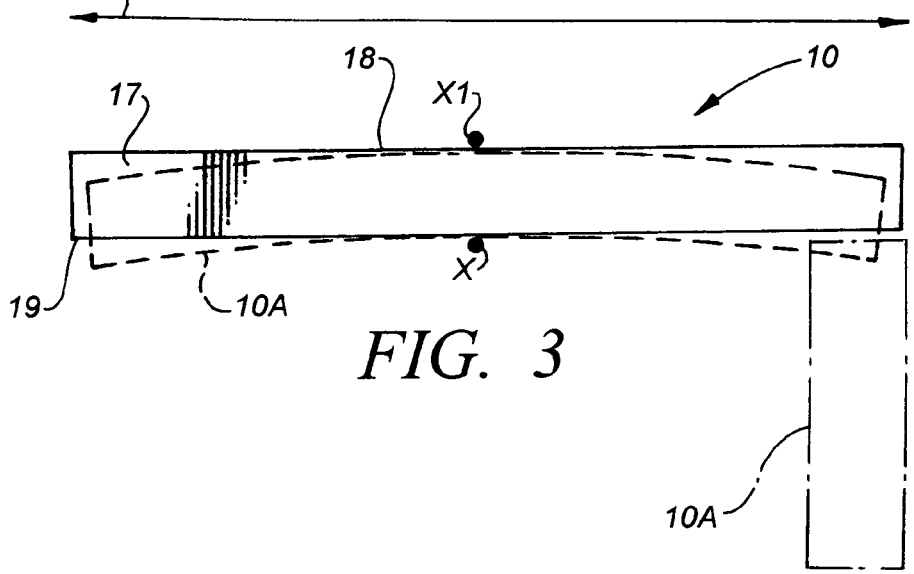
FIG. 3 is a side elevation view illustrating the mode of operation of a track utilized in the practice of the invention; and, FIG. 4 is an exploded perspective view illustrating apparatus constructed in accordance with the principles of the invention and illustrating a removable insert utilized to strengthen the apparatus during the application of a cast to an individual.

Track 10 preferably is somewhat pliable along its length such that track 10 will bend downwardly longitudinally in the manner indicated by dashed lines 10A about an axis X (of upwardly about on axis X1) that in FIG. 3 is perpendicular to the plane of the sheet of paper of the drawing. This permit track 10 to conform to the body of an individual. On the other hand, it is preferred to limit the ability of track 10 to bend transversely about an axis Y that in FIG. 3 is perpendicular to the plane of the sheet of paper of the drawing. In other word, track 10 is transversely substantially rigid. Transverse rigidity is important because it significantly reduces the likelihood that track 10 will transversely bend and then bind foot 21 as it moves along track 10.

Bit 20 includes cutting shaft 22 and foot 21 fixedly attached to the distal end 27 of shaft 22. The outer surface 22A of shaft 22 is serrated or otherwise shaped and dimensioned and configure to cut through strip 15 and ribs 60 and 61 when bit 20 rotates about the longitudinal axis of bit 20. Proximate, or upper, end of shaft 22 is engaged by a drill chuck (not shown) or other apparatus that rotates bit 20. Foot 21 includes upper surface 26, bottom surface 24, and peripheral cylindrically shaped outer surface 25. Bottom surface 24 can, as indicated by dashed line 24A in FIG. 2, have a convex shape to facilitate movement of foot 21 along primary opening 11. Foot 21 is shaped and dimensioned generally to fit in, conform to, and move along primary opening 11. In this manner, when foot 21 is slid or otherwise moved along the length of opening 11, opening 11 restricts lateral movement of foot 21 in the directions of arrows A and B and restricts vertical movement of foot 21 upwardly in the direction of arrow C (FIG. 1). Primary opening in essence functions to "capture" foot while permitting foot 21 to be freely moved along the length of opening 11 while bit 20 is rotating. The rounded cylindrical outer surface 25 of bit 20 provides a minimal contact area in the event foot 21 bears against a side 51, 52. Bottom surface 24 readily rotates over bottom 50 of opening 11. Bottom surface 24 of foot 21 preferably, but not necessarily, has a convex shape to minimize the area of surface 24 that is contact with bottom 50 at any given time.

Rectangular foot 40 (FIG. 1) is, in a manner similar to foot 21, shaped and dimensioned to fit in and freely slide along opening 11. A saw blade 42 is mounted on the top 41 of foot 40 to rotate in a selected one of the directions indicated by arrows 43. A motor or other motive power (not shown) is provided to turn blade 42 such that it cuts through a fiberglass cast while foot 40 travels along the length of opening 11.

Rectangular foot 30 (FIG. 1) is, in a manner similar to feet 21 and 40, shaped and dimensioned to fit in and freely slide along opening 11. A scissor jaw 32 is pivotally 33 mounted on foot 30 and pivotally reciprocated in the manner indicated by arrows H to cut through a fiberglass cast while foot 30 travel along the length of opening 11.

In use, a strip of soft cast padding/stockingette material is wrapped 13 (FIG. 1) around an arm, leg, or other body area on which a cast is to be mounted. The protective paper or polymer strip (not shown) cover adhesive layer 16 is removed, and track 10 is placed on the arm generally parallel to the longitudinal axis of the arm. Adhesive layer 16 secures track 10 to the layer of cotton lining material, (or to a layer(s) of another material or to the skin if such a layer is not utilized. A fiberglass cast 14 is then applied around the arm and is allowed to harden. The fiberglass cast 14 covers substantially the entire length of track 10 except, however, the ends of track 10 are left exposed, or accessible, to facilitate the use of bit 20. At some subsequent time, the cast needs to be removed. At that time, bit 20 is rotated, and foot 21 is moved into one end of primary opening 11 in the manner illustrated in FIG. 2 and is moved along the entire length of opening 11 to cut the fiberglass cast. When foot 21 moves into opening 11, shaft 22 extends upwardly through secondary opening 18A and simultaneously cuts through strip 15 and the portion of cast 14 positioned directly above secondary opening 18A. A portion of rotating shaft 22 moves along secondary opening 18A (FIG. 2) simultaneously with the movement of foot 21 along primary opening 11.

Figure 4:
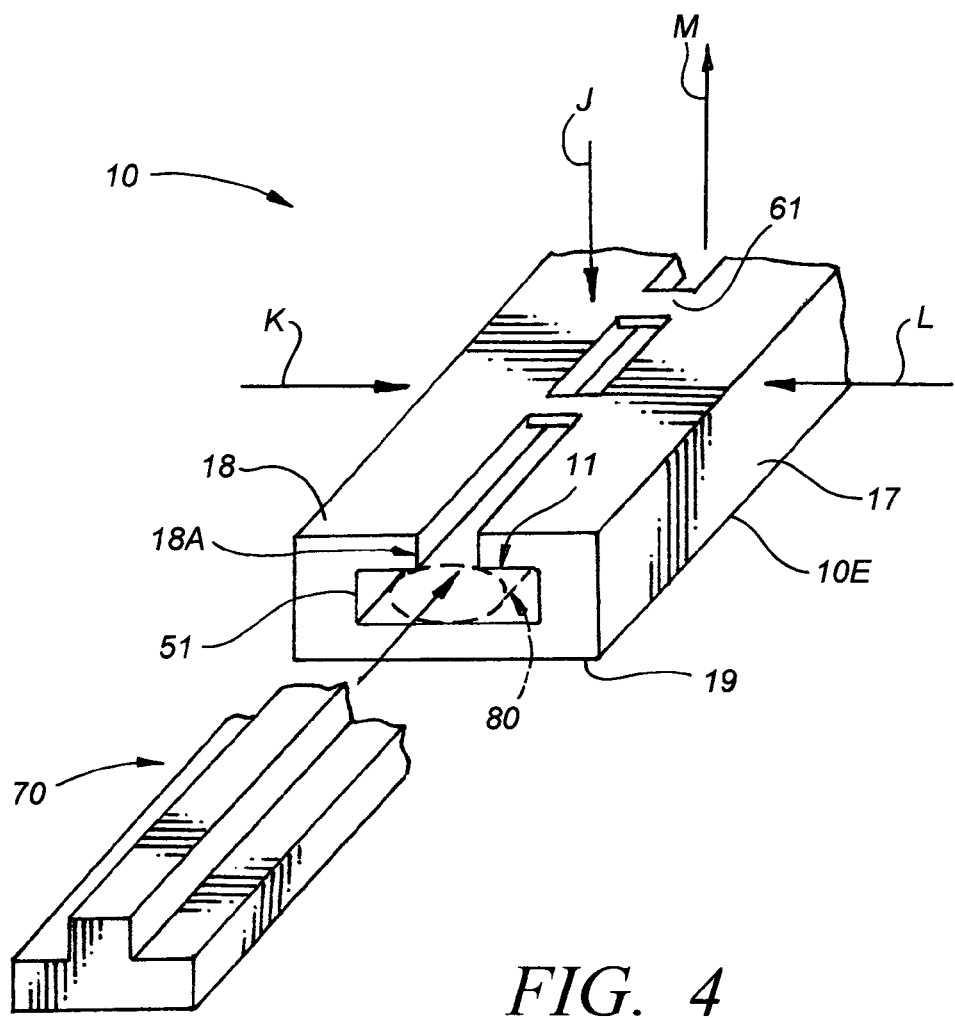

In one preferred embodiment of the invention, when bit 20 is rotated and foot 21 is moved along opening 11 to cut through cast 14, bit 20 is pulled upwardly in the direction of arrow M (FIG. 4). The magnitude of the force generated in the direction of arrow M can vary as desired, but ordinarily is relatively small and, in contrast to a Stryker saw, is sufficient to insure that track 10 is not downwardly pressed against the body of the individual while bit 20 cuts through cast 14. If the magnitude of force M is too great, the friction forces generated when rotating foot 21 bears against ceiling 53 can unnecessarily impede the ready movement of foot 21 along opening 11.

FIG. 1 illustrates only a single track 10 on the arm of an individual. As would be appreciated by those of skill in the art, cast 14 ordinarily needs to cut along two opposing sides to be removed. Accordingly, a second track (not visible in FIG. 1) is placed on layer 13 on the opposite side of the arm at the same time track 10 is placed on layer 13. When cast 14 is applied, it covers both tracks. In other words, the procedure for installing the second track is equivalent to that for installing track 10. When the time comes to remove a fiberglass cast 14, rotating bit 20 is moved along track 10 to make one cut through cast 14, and is then moved along the second track to make a second cut through cast 14. The two cuts function to halve the cast to permit ready removal of the cast from the individual's arm.

A length of track 10 can be wound and stored on a roll such that a desired length of track 10 can be pulled off the roll and cut from the roll, much like rope is stored on a large roll and desired lengths of rope are measured and cut from the rope remaining on the roll.

In some instances, a cast 14 made from fiberglass or an equivalent material is applied to portions of an individual's body that are at an angle to one another. For example, in some cases it is desirable to maintain the lower arm generally perpendicular to the upper arm. In this instance, two lengths 10, 10A (FIG. 3) of track can be utilized. One length is along the lower arm. The other length is along the upper arm. In FIG. 3, adjacent ends of tracks 10, 10A generally co-terminate. If desired, however, one adjacent end can extend past the other adjacent end. If after bit 20 is utilized, a portion of a cast remains uncut, then the scissors-like cutting apparatus 30, 32 of FIG. 1 (or another other desired apparatus) can be utilized to finished cutting the cast.

In FIG. 1, foot 31 of tool 30 is shaped and dimensioned generally to fit in, conform to, and move along primary opening 11. In this manner, when foot 31 is slid or otherwise moved along the length of opening 11, opening 11 restricts lateral movement of foot 31 in the directions of arrows A and B and restricts vertical movement of foot 31 upwardly in the direction of arrow C (FIG. 1). Primary opening 11 and foot 31 function in combination to "capture" and restrict the movement of foot 31 while permitting foot 31 to be freely moved along the length of opening 11 while scissors jaw 32 is manipulated about pivot pin 33 in the directions indicated by arrows P in order to cut a cast. If desired, a lower jaw can be provided which also pivots about pin 33 and opposes jaw 32 in the manner that a pair of conventional scissors have a pair of opposing jaws pivoting about a common point.

In FIG. 1, foot 41 of tool 40 is shaped and dimensioned generally to fit in, conform to, and move along primary opening 11. In this manner, when foot 41 is slid or otherwise moved along the length of opening 11, opening 11 restricts lateral movement of foot 41 in the directions of arrows A and B and restricts vertical movement of foot 41 upwardly in the direction of arrow C (FIG. 1). Primary opening 11 and foot 14 function in combination to "capture" foot 41 while permitting foot 41 to be freely moved along the length of opening 11 while saw blade 42 rotates in one of the directions indicated by arrows 43. A slot 40A can be formed in tool 40 so that blade 42 can travel up and down in slot 40A while the blade 42 is cutting the a fiberglass cast 14.

In FIG. 4, insert 70 is shaped and dimensioned to generally conform to and to be slidably inserted simultaneously into primary opening 11 and secondary opening 18A. When track 10 is placed on a part of an individual's body and a fiberglass cast 14 is wrapped around track 10, forces acting in the direction of arrows J, K, and L are generated, act against, and tend to deform track 10. Insert 70 functions to maintain the shape and dimension of track 10 and, in particular, of openings 11 and 18A. Maintaining the shape of openings 11 and 18A is important because foot 21 and shaft 22 must freely move along openings 11 and 18A, respectively, when bit 20 is utilized to cut through and remove cast 14. An insert that provides support for track 10 need not have the "inverted T" shape of insert 70 or conform closely to the shape and dimension of openings 11 and 18A. An insert 71 with an oval or circular or other cross-sectional area can function, when inserted in track 10, to provide support and prevent or minimize the deformation of track 10 when forces J, K, or L are applied to track 10. As is illustrated in FIG. 3, track 10 can, if desired, be somewhat pliable along its length such that track 10 will bend downwardly (or upwardly) longitudinally. An insert 70, 71 can similarly be somewhat pliable and bend downwardly (or upwardly) along its longitudinal axis such that track 10 and an insert 70, 71 can—when insert 70, 71 is slidably inserted in openings 11 and/or 18A and extends along (either partially or completely) the length of track 10—bend simultaneously along their longitudinal axes.

Unless reasons exist to the contrary, judicial notice is taken of the following facts:

1. First Trend. There was, in the relevant market comprising the marketing and use of cast-removal equipment, a long felt trend to place an elongate tubular guide or channel on a portion of the body of an individual prior to applying the cast and permitting the cast to solidify. The cast, when applied, covered the tubular guide. When the time came to remove the cast an elongate cutting wire was fed through the tubular guide. The cutting wire is oscillated back and forth to outwardly cut through the cast, or is otherwise forced outwardly through the cast to cut the cast.
2. Second Trend. There was, in the relevant market comprising the marketing and use of cast-removal equipment, a long felt trend to place an elongate tubular guide or channel on a portion of the body of an individual prior to applying the cast and permitting the cast to solidify. The cast, when applied, covered the tubular guide. When the time comes to remove the cast scissors are utilized to cut through the cast. The tubular guide helps to direct the scissors.
3. Third Trend. There was, in the relevant market comprising the marketing and use of cast-removal equipment, a long felt trend to utilize a shield comprising an elongate relatively flat strip of material. The shield was placed on a portion of the body of an individual prior to applying the cast and permitting the cast to solidify. The cast, when applied, covered the strip of material. When the time came to remove the cast with a cutting tool, the flat strip of material functioned to shield the individual from the cutting tool.
4. Fourth Trend. There was, in the relevant market comprising the marketing and use of cast-removal equipment, a long felt trend to utilize a tool with a fixed foot that a user slides along shield strip or guide channel. The tool also included a rotary cutting tool that was situated above the fixed foot and cut the cast.
5. Fifth Trend. There is, in the relevant market comprising the marketing and use of cast-removal equipment, a current long felt trend to remove a cast by utilizing a Stryker saw or similar saw tool. The Stryker saw normally is not utilized in connection with a protective strip or with a guide. The user simply does his or her best to guide and control the saw and to not inadvertently burn the skin of an individual. Such inadvertent burns do, however, occur on a fairly regular basis. During use of a Stryker saw, the rotary saw blade is pushed against a cast in a direction toward the part of the individual's body on which the cast that is being removed is mounted. After the rotating saw blade is pushed a desired distance toward the individual's body and makes an arcuate cut of a selected depth in the cast, the saw is pulled away from the cast, is indexed or moved a short distance along the cast in a direction parallel to the longitudinal axis of the cast, and is again pushed toward the part of the individual's body on which the cast is mounted. This push-pull movement of the Stryker saw is repeated along the length of the cast to produce a series of arcuate ingress cuts that extend from the outer surface of the cast 14 and into cast 14 toward the part of the user's body from which the cast that is being removed. The Stryker saw is also intermittently moved in a direction parallel to the longitudinal axis of the cast in order to cut through portions of cast 14 that extend between adjacent ingress cuts. When a Stryker saw blade is pushed against a cast 14, the cast 14 is pressed against the body of the individual. Such pressure can prove alarming to the individual from whom the cast is being removed and can, along with the noise and odor associated with the saw, contribute significantly to the fear that an individual experiences when the saw is utilized to cut through the individual's cast.

6. The noise associated with use of a Stryker saw often effectively functions to terrify children, particularly young children, who are having a cast removed. Such fear on the part of a child is magnified when a user inadvertently contacts and burns or cuts the skin of the child with the saw blade.

7. The Stryker saw is currently by far the presently preferred, if not the only, method of removing a cast. The methods and tools set forth above in the first through the fourth trends are basically largely, if not entirely, obsolete, are currently ignored, and in the real world exist only in the print and paper comprising earlier issued patents, magazine articles, and other documents.

8. The Stryker saw has evidently been the preferred method of removing a cast for at least the last twenty (20) years.

9. During the last twenty (20) years any perceived motivation to provide an alternate method or removing a cast has not provided sufficient impetus to displace use of the Stryker saw, or to reinstate the obsolete methodology set forth in prior issued patents or other documents.

10. The apparatus described above with respect to the $1^{st}$, $2^{nd}$, $3^{rd}$, and $4^{th}$ trends is rarely, if at all, utilized today to remove a cast.

11. One particular unexpected benefit discovered during development of the invention is that utilizing the track 10 in conjunction with a foot 21 that conforms to the cross sectional area of track 10 enables an individual engaged in removing a cast 14 to control readily the movement of bit 20 along track 10 and to prevent movement of bit 20 in the directions indicated by arrows A to C in FIG. 1.

12. Another benefit discovered after the invention was developed is that the use of a rotating foot 21 facilitates, and does not interfere with, movement of bit 20 along track 10.

13. There is no identified problem in the relevant market that provided sufficient impetus to develop the invention.

14. There is no identified problem in the relevant market that suggests a readily apparent specific set of solutions, one of which is the invention.

15. There is no identified motivation in the relevant market that provided sufficient impetus for the development of the invention.

16. Common sense judgment requires that valid reasoning justifying such judgment be set forth.

17. The TSM test, per KSR, can provide helpful insight into evaluating the obviousness of the invention.

18. There is no reason not to use the TSM test in evaluating the obviousness of the invention described and claimed herein.

19. Motivation. Making something better is a broad, general, long-existing motivation that applies to each invention. Broad, general, long-existing motivations likely provide little significant impetus to produce an invention. For example, in the exercise machine art, one broad, general, long-existing motivation is to make exercise machines versatile, so that more than one exercise can be produced on an exercise machine. This motivation typically provides little significant impetus to produce an invention. If, on the other hand, an exercise machine produces a greater than normal number of injuries, such a problem is more specific and provides stronger impetus to improve the machine.

20. Assessing Weight Accorded a Problem or Motivation. The weight or importance of a problem or motivation in leading to an invention is apprised by evaluating by (1) how long the problem has existed, (2) the importance, and hence the driving force, of the problem or motivation, (3) whether the problem or motivation reasonably suggests the invention, (4) whether the motivation reasonably suggests a set of solutions of which the invention is one, (5) the trends, if any, produced by the problem or motivation, and (6) other solutions produced in response to the motivation or problem. With respect to (1) above in this paragraph, if a problem has long existed without producing a solution, that suggests the invention is not obvious. With respect to (2) above in this paragraph, if the problem appears to have little significance, that suggests it is not driving those of skill in the art toward the invention. With respect to (3) above, if the problem suggests a solution other than the invention, this suggests the problem is not driving those of skill in the art toward the invention. With respect to (4) above in this paragraph, if the problem suggests a set of solutions other than the invention, this suggests the problem is not leading toward the invention. With respect to (5) above, if the prevailing trends lead away from the invention or reinforce other solutions to the invention, that suggests the problem has not presented the invention as a solution. With respect to (6) above in this paragraph, other solutions may reinforce the idea that the art is satisfied with the status quo and not interested in alternate solutions.

21. Common Sense. Proposed definitions of common sense are set forth below.

A. The People In Common (PIC) definition: "The earth is flat".

One definition of common sense is what people in common would agree upon, that which they "sense" as their common natural understanding or would consider in most people's experience to be prudent and of sound judgment. This definition assumes a country with a population with a particular baseline language, customs and knowledge. The baseline knowledge is knowledge available and known by a large majority of the population, and is knowledge that typically does not require specialized knowledge or study; such baseline knowledge can change over time depending on the success of educational institutions, changing societal climes, etc. Under the people in common (PIC) definition, common sense often has been wrong and, for example, at one time held that the earth was flat. Even today it evidently is estimated that 60% of the people on earth believe the sun revolves around the earth. Others today use "common sense" to make the judgment that heavier bodies fall faster than light bodies.

B. The Common Man Sound Judgment (CMSJ) definition.

A second definition of common sense is sound judgment based on a simple perception of the situation or facts. Sound judgment means sensible judgment based on valid reasoning. This suggests that a common sense judgment, if reliable, is subject to evaluation to see if there are reasons or criteria that support and justify the judgment. This definition assumes a country with a population with a particular baseline language, customs and knowledge. The baseline knowledge is knowledge available and known by a large majority of the population, and is knowledge that typically does not require specialized knowledge or study; such baseline knowledge can change overtime depending on the success of educational institutions, changing societal climes, etc. What might be common sense to an American might not be common sense to a person living in another country. An individual could move to the United States from India and what might appear common sense to an American would, because of the culture of India, make absolutely no sense to the Indian. In evaluating obviousness, however, it is usually, for better or worse, assumed that the Indian has the same baseline knowledge as individuals who have grown up in the United States.

C. The Ordinary Skill Sound Judgment (OSSJ) definition.

A third definition of common sense is sound judgment by one of ordinary skill in the art based on a perception of the situation or facts in the context of the baseline knowledge in CMSJ and of specialized knowledge that is over and above said baseline knowledge and is attributed to one of ordinary skill in the art. As noted, sound judgment means sensible judgment based on valid reasoning. This suggests that a common sense judgment by one or ordinary skill in the art is, if reliable, subject to evaluation to see if there are reasons or criteria that support and justify the judgment. This definition assumes a country with a population with a particular baseline language, customs and knowledge. The baseline knowledge and specialized knowledge comprise knowledge available and known by a large majority of those of skill in the art; such baseline knowledge and specialized knowledge can change over time depending on the success of educational institutions, advances in the art, changing societal climes, etc. What might be common sense to an American of ordinary skill in the art might not be common sense to a person that lives in another country and appears to be one of ordinary skill in the art. In evaluating obviousness, however, it is usually, for better or worse, assumed that the person of ordinary skill in the art from India has the same baseline knowledge as individuals of skill in the art who have grown up in the United States. In some technically simple inventions, the ordinary skill sound judgment (OSSJ) may be commensurate with common man sound judgment (CMSJ) because there is little if any specialized knowledge required. For example, a new Christmas tree ornament design might not require any particular specialized knowledge over and above the baseline knowledge of the large majority of people. In contrast, many inventions obviously require a specialized knowledge over and above commonly held baseline knowledge, in which case such specialized knowledge will be utilized in the sound reasoning involved in ordinary skill sound judgment common sense.

As used herein, relying on common sense judgment requires that valid reasoning justifying such judgment be set forth. Hence, the common man sound judgment (CMSJ) and ordinary skill sound judgment (OSSJ) definitions are generally relied on herein in determining the obviousness of an invention.

22. Assessment of Trends. As used herein a trend is a general inclination or tendency. A trend generally (1) occurs over an extended period of time, (2) occurs by or within a large number of individuals in the pertinent art, and (3) often can be demonstrated by the existence of a significant number of printed references and by personal knowledge of those in the art. With respect to (1) above in this paragraph, a general inclination that lasts a short period of time, for example a day or a month, typically does not constitute a trend. With respect to (2) above in this paragraph, if only a few individuals demonstrate a general inclination or tendency, such typically does not comprise a trend. With respect to (3) above in this paragraph, if there are only a few documents that demonstrate a particular inclination or tendency, such typically does not demonstrate a trend.

The weight or importance of a trend in leading to an invention is evaluated by assessing (1) the length of time during which the trend has existed, (2) the number of individuals that believed or followed the trend, (3) the number of references that describe the trend, (4) the existence of other similar or related trends that might obfuscate or invalidate a trend and make it unlikely to lead to the invention, and (5) the existence of countervailing trends. If a trend is "buried" among many comparable trends in the art, it becomes more unlikely that one of ordinary skill will notice or utilize the trend. If a trend is overshadowed by countervailing trends, it becomes more unlikely that one of ordinary skill will notice or utilize the trend.

23. Assessing an Equivalent. As used herein, an equivalent is a structure or a system that is functionally or structurally equivalent to another structure or system. In determining whether it is obvious to substitute one "equivalent" for another, the following must be evaluated. First, is what is being substituted truly an equivalent? Is it functionally or structurally equivalent to what is being replaced? Second, if the equivalent is functionally or structurally equivalent, is it only structurally equivalent or only functionally equivalent? If it is only one or the other, this reduces the likelihood the equivalent would be used. Third, did the equivalent, or the invention, have to be modified to use the equivalent? If so, this reduces the likelihood the equivalent would be utilized. Fourth, is it likely the equivalent would be considered by one of ordinary skill in the art? If a new Christmas ornament utilizes a laminate including an outer protection coating from a prior Christmas ornament and substitutes that coating as an "equivalent" for the outer protective coating in another known Christmas ornament, then it arguably is likely that such a substitution would be considered by one of skill in the art. On the other hand, if the first substitute coating is normally found in a nuclear reactor in a submarine, it may be very unlikely, almost incredible, that such a coating would be considered and a substitution would be made. Simply stating that it would be known by one of skill in the art to substitute an equivalent is not, without providing reasons, believed sufficient. Otherwise such a generalized rationale could be used to invalidate most, if not all, patents known to man.

Having set forth our invention in terms to enable those skilled in the art to understand and practice the invention and having set forth the presently preferred embodiments and uses thereof, We claim:

1. A method of installing a fiberglass cast on and cutting the cast for removal from an individual, comprising the steps of:
    (a) providing a track (10) with
        (i) a top,
        (ii) a bottom,
        (iii) a length (L),
        (iv) an elongate primary guide opening (11) extending said length of said track, said opening having a width (W) and a selected shape and dimension,
        (v) an elongate secondary guide opening (18) extending from said primary opening upwardly to said top, and having a width less than said primary opening;
    (b) providing a rotatable bit (20) including
        (i) a rotatable shaft (22) with
            an outer surface shaped and dimensioned to cut through a fiberglass cast,
            a width less than said width of said secondary guide opening,
            a distal end (27), and
            shaped and dimensioned to move along said secondary opening,
        (ii) a tracking foot (21)
            attached to said distal end of said shaft,
            having an outer surface (25),
            having a width greater than said width of said shaft (22) and less than said width of said primary opening,
            free of cutting surfaces, and
            shaped and dimensioned to generally conform to said shape and dimension of the cross sectional area of said primary guide opening to minimize lateral movement of said foot in said primary guide opening and to permit said foot to move freely along said primary opening;
    (c) placing said track (10) on an individual;
    (d) applying at a first selected time a cast on said individual, said cast covering substantially all of said track (10);
    (e) at a second selected time subsequent to said first time,
        (i) rotating said bit,
        (ii) moving said foot along said primary opening and said shaft along said secondary opening such that said shaft cuts through said cast.

\* \* \* \* \*